United States Patent [19]

Ross et al.

[11] 3,801,976

[45] Apr. 2, 1974

[54] TRANSMISSION LINE PRESENCE SENSOR

[75] Inventors: Gerald F. Ross, Lexington; Joseph D. DeLorenzo, Sudbury; David Lamensdorf, Cambridge, all of Mass.

[73] Assignee: Sperry Rand Corporation, New York, N.Y.

[22] Filed: Dec. 6, 1971

[21] Appl. No.: 205,089

[52] U.S. Cl. ........ 340/258 R, 340/258 C, 340/38 L
[51] Int. Cl. ...................... G01s 11/00, G08b 13/00
[58] Field of Search .......... 340/258 R, 258 C, 38 L, 340/38 R; 174/39

[56] References Cited
UNITED STATES PATENTS

| | | | |
|---|---|---|---|
| 3,375,511 | 3/1968 | Trimble | 340/258 |
| 2,532,231 | 11/1950 | Jarvis | 340/38 L |
| 3,623,101 | 11/1971 | Grebe | 340/258 C X |
| 3,422,431 | 1/1969 | Hafner | 340/258 X |
| 3,270,339 | 8/1966 | McEven | 340/258 X |
| 3,031,643 | 4/1962 | Sheftelman | 340/258 |
| 3,068,448 | 12/1962 | Mountjoy | 340/258 C X |

Primary Examiner—John W. Caldwell
Assistant Examiner—Scott F. Partridge
Attorney, Agent, or Firm—Howard P. Terry

[57] ABSTRACT

A high frequency generator-receiver system for detecting the presence or proximity of objects including persons or vehicles employs continuous wave transmission of high frequency electromagnetic signals and reception thereof with respect to a transmission line energy coupling system by a receiver circuit cooperating with the transmission line coupling system for detecting changes in the coupled signal energy and for providing corresponding outputs suitable for indication or other reaction to the presence of such proximate objects.

4 Claims, 11 Drawing Figures

PATENTED APR 2 1974 3,801,976

TRANSMISSION LINE PRESENCE SENSOR

BACKGROUND OF THE INVENTION

1. Field of the Invention

The invention relates to radio systems for the detection of the presence of objects such as persons or vehicles and more particularly relates to the sensing of the presence of such objects as may move along a passageway or a vehicular traffic lane. Detection is accomplished by a novel transmission line energy coupling system, excited by continuous wave high frequency electromagnetic signals, wherein detectable changes in the level of energy coupling are caused to be sensed by the passage of the object.

2. Description of the Prior Art

Prior art devices for sensing the presence of objects such as persons or vehicles at a particular station on a vehicular lane or other passageway have not proven adequately immune to disturbances in the environment in which such devices are used in largest numbers. Furthermore, sensors adequate for sensing vehicle presence, usually by detecting a magnetic characteristic such as the presence of or a distortion of a magnetic field, have not been found fully adequate for detecting the presence of other objects of different nature such as pedestrians, and vice versa.

Detectors sensing disturbances in unidirectional or low frequency fields are relatively insensitive and are particularly susceptible to background noise signals, such as electrical noise signals generally present in industrial cities, and usually operate on magnetic principles and therefore generally do not detect the presence of non-magnetic objects, including pedestrians. While relatively simple in nature, they generally sense only slowly varying characteristics and therefore often do not afford precise, fail-proof operation.

Other sensors operate at kilocycle and higher frequencies; bridge and other such circuit devices are often quite susceptible to the nature of their environments and may totally fail in the presence of rain or snow, thereby rendering them unsuited to use where high accuracy, high reliability, and reasonable freedom from generation of false alarms is demanded. Such equipment often produces undesired false alarms or, to prevent such false alarms, requires reduction of sensitivity in a significant degree. Such high frequency sensors are often undesirably sensitive to changing temperature and to drift in supply voltage. Again the sensitivity of these prior art devices is often dependent on the balancing of a bridge or the tuning or detuning of resonant circuits and therefore they also derive their outputs by sensing relatively slowly varying parameters rather than rapidly varying parameters.

SUMMARY OF THE INVENTION

The present invention relates to high frequency transmission line coupling means for detecting the presence of objects that traverse the coupling device in contacting, substantially contacting, or other proximate relation. Such traversal creates an abrupt change in the degree of coupling between substantially parallel coupled transmission line conductors. The length of the active coupling region between the parallel transmission lines is adjusted in terms of the wave length of the excitation of the transmission line system so that the normal output of the coupled system is substantially zero. However, the perturbed output is a rapidly changing function of the transient disturbance rate. The distinctive output of the coupler system generates a useful output pulse for operation of an alarm, a counter, or other operational or control device.

DESCRIPTION OF THE PREFERRED EMBODIMENTS

Figure 1:
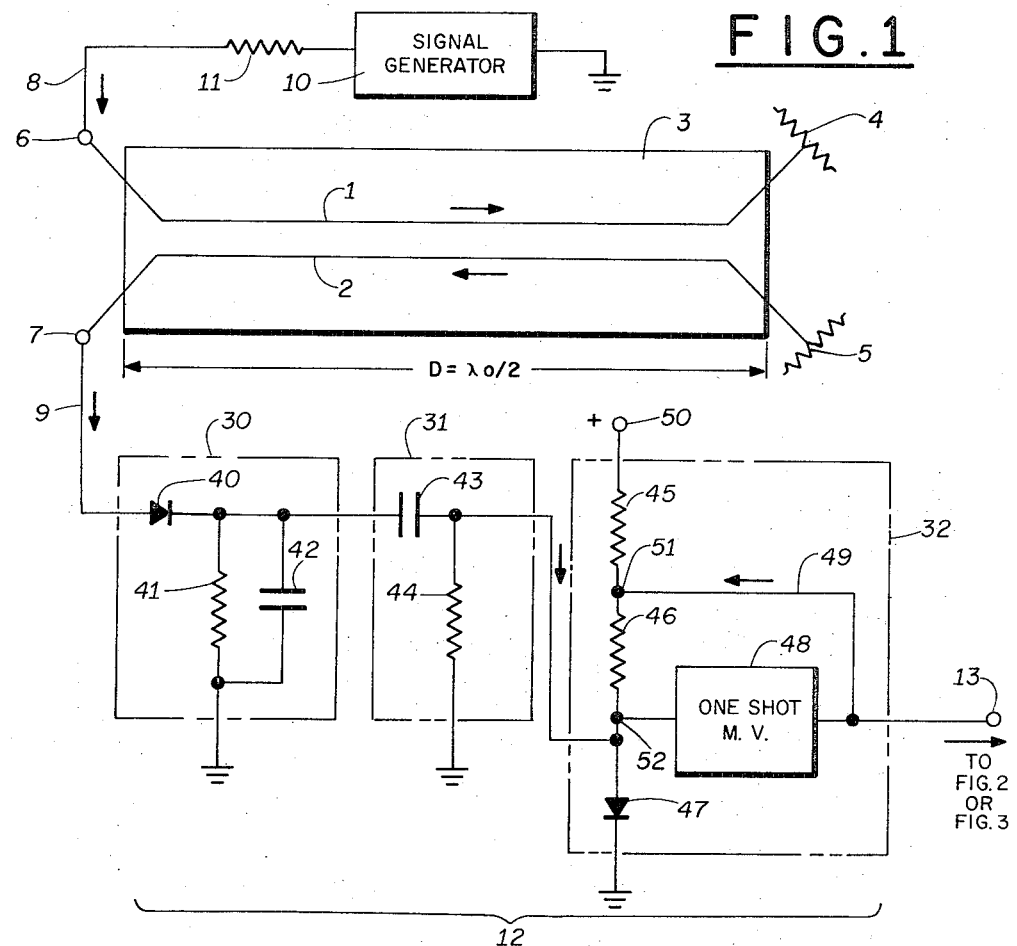
FIG. 1 is a schematic plan view of the novel sensor with details of signal generator and signal processor receiver circuits with which the sensor is operated.

The transmission line object-presence sensor shown schematically in FIG. 1 detects the actual presence of an object traversing it in contacting, substantially contacting, or other relation by measuring a function of the change caused by the presence of the object in the amplitude of the electrical signal coupled between the substantially parallel high frequency transmission line conductors 1 and 2. The transmission line system comprising conductors 1 and 2 may be of the strip transmission line type conventionally used in the high frequency art. In particular, the preferred transmission line system will generally be one capable of propagating electromagnetic energy in the low loss, transverse electromagnetic or TEM mode.

Figure 4:
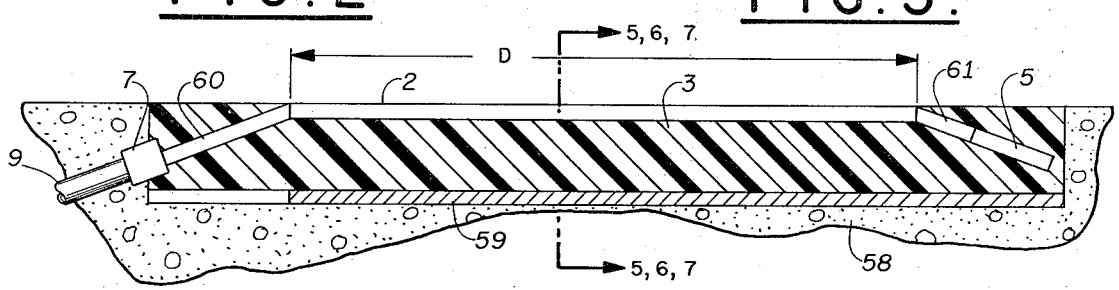
FIG. 4 is an elevation view, partly in cross section, of the sensor of FIG. 1.

The high frequency conductors 1 and 2 are affixed to the top surface of a substrate sheet 3 of low loss dielectric material. A metallic ground conducting plane 59 as seen in FIG. 4 is affixed to the bottom of sheet 3. At one end of the transmission line conductors 1 and 2 are respectively located conventional impedance matching connectors 6 and 7 for coupling to respective conventional input and output transmission lines 8 and 9, which latter lines may be coaxial transmission lines. At the end of the substrate sheet 3 opposite connectors 6 and 7, the strip conductors 1 and 2 are coupled to impedance matched terminating resistors or energy absorbers 4 and 5 for minimizing reflections. Signal generator 10 is adapted to supply excitation signals to transmission line 1 via resistor 11 and coaxial line 8. The signal processing receiver 12 is coupled to transmission line conductor 2 via coaxial line 9 and supplies useful output signals to a utilization device coupled to output terminal 13. Such output signals are generated when an object contacts conductors 1 and 2 or otherwise distorts the electromagnetic coupling between conductors 1 and 2.

Figures 2, 3:
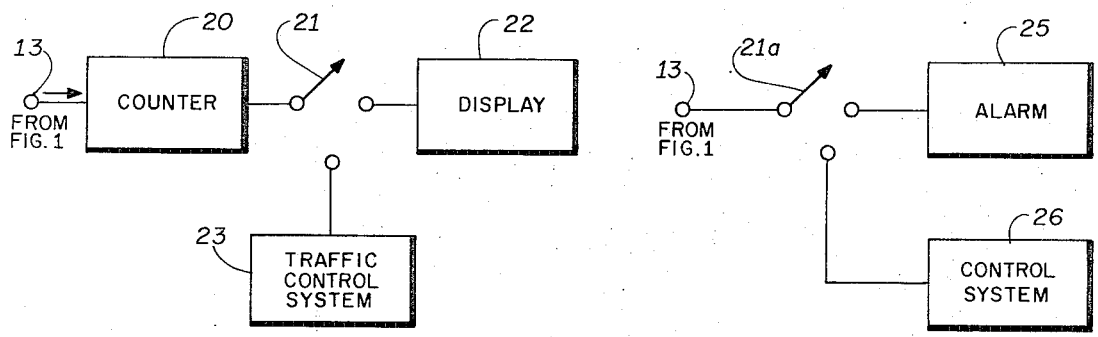
FIGS. 2 and 3 are block diagrams of apparatus with which the arrangement of FIG. 1 may be used.

It is to be recognized that the utilization device coupled to output terminal 13 may be any conventional type of alarm, latchable or otherwise, or may be a pedestrian counter or other suitable vehicular traffic control display or device. As in FIG. 2 a counter circuit 20 may be used to count the total number of objects passing or the number per units of time, as desired. When switch 21 is properly set, the resultant count may be displayed by a conventional numerical display 22. On the other hand, the count may be supplied by switch 21 for use in a conventional vehicular traffic controller 23. As in FIG. 3, terminal 13 may be connected through switch 21a to an alarm device 25 for sounding an alarm on the passage of a single object or a predetermined number of objects. With switch 21a appropriately positioned, control device 26 may be operated for the purpose of causing an actuator to open a door or to operate other servo controlled devices.

Signal generator 10 may be selected from a variety of high frequency oscillators well known in the art such, for example, as an IMPATT or impact avalanche transit time diode oscillator operating in the L or S band frequency spectrum. Other types of relatively stable, medium power oscillators will be found suitable.

The signal processing receiver 12 consists of three parts in series relation, the first comprising a diode detector circuit 30, the second a filter circuit 31, and the third a threshold detector 32. Diode detector circuit 30 employs a rectifying diode 40 with a resistor 41 connected to the output of diode 40 to ground in shunt with a capacitor 42. Diode detector circuit 30 normally produces a substantially constant unidirectional voltage for supply to filter 31. Filter 31 is a simple high-pass filter consisting of a series capacitor 43 whose output side is coupled through resistor 44 to ground. Filter 31 responds only to relatively fast changes in the amplitude of the output of detector circuit 30, acting as a differentiator circuit to pass an impulse to threshold circuit 32 when an object passes over transmission line conductors 1, 2.

Threshold circuit 32 features a diode 47, which diode 47 is coupled to ground and through series resistors 45 and 46 to a suiable source of bias voltage (not shown) connected to terminal 50. Diode 47 is preferably a tunnel diode or other high speed diode adapted to serve as an impulse detector. A suitable diode has a negative resistance current-voltage characteristic such that, under proper bias, the diode response to the arrival of impulse emission from filter 31 is to move abruptly into its region of instability, causing it to become highly conductive.

In this manner, a current impulse of somewhat greater amplitude than the input pulse, but of considerably longer duration is generated by tunnel diode 47 and is coupled to the input of one shot multivibrator circuit 48; the longer duration, higher energy signal is desired for reliable triggering of one shot multivibrator 48. The output pulse of multivibrator 48 is a rectangular pulse of, for example, 100 nanosecond duration which is passed to output terminal 13. The 100 nanosecond pulse is coupled also by lead 49 to the junction 51 between bias control resistors 45 and 46. At junction 52, the trailing edge of the 100 nanosecond pulse has the effect of resetting diode 47 and of stopping conduction therethrough. Thus, tunnel diode 47 is reset to its original low conduction state and is prepared to receive the next arriving impulse from filter 31 which exceeds the triggering level of diode 47. Other types of receiver elements performing the function of circuit 32 may be employed such as, for example, receivers of the general type described by K.W. Robbins in the U.S. Pat. application Ser. No. 123,720 for a "Short Base-Band Pulse Receiver", filed Mar. 12, 1971, issued May 9, 1972, as U.S. Pat. No. 3,662,316, and assigned to the Sperry Rand Corporation.

As noted above, the presence sensor may consist of two spaced parallel strip conductors 1 and 2 placed across the path of the object to be detected. Detection of the object (a wheel of a vehicle or a shoe on a human foot, for example) occurs when the presence of the object causes a change or distortion in the electromagnetic-field-coupling pattern between conductors 1 and 2. The sensor elements may, for instance, be placed in a shallow groove in the surface of a passageway, road, or walk or it may be fastened directly to such a surface by a non-conducting cement such as an epoxy or other similar cement. A similar material may be used to form a protective coating over conductors 1 and 2.

FIG. 4 and FIGS. 5 to 7 illustrate simple arrangements according to the invention whereby the sensor may be permanently located in a passageway, roadway, or walkway. In FIG. 4, only a view of the output transmission line 2 of the coupler device is seen, it being connected by an extension 60 of line 2 to connector 7 and thus to coaxial line 9. Opposite the extension 60, line 2 is provided with a second extension 61 leading to termination 5 which may be buried in the body of the dielectric substrate layer 3. It will be understood that the input transmission line 1 of the coupler may have similarly disposed input and terminating transmission line elements. The sensor structure may be permanently inlaid in a suitable depression in a roadway 58 made of concrete or other nonmetallic material.

Figure 5:
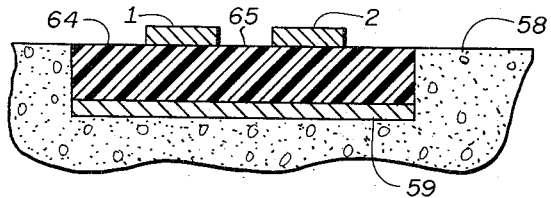
FIGS. 5, 6, and 7 are cross section views of alternative constructions for the apparatus of FIGS. 1 and 4, taken along the line 5, 6, 7 of FIG. 4.

As shown in FIG. 5, the invention may employ strip transmission line similar to commercial strip line, which is readily available in rigid form and may be laid in a shallow groove across the roadway or passageway to be monitored. Such conventional strip lines have good thermal stability and relatively little susceptibility to environmental effects. Evidently, strip transmission lines of superior quality may be constructed by a suitable choice of preferred conductive and dielectric materials, of which a wide variety is readily available.

Figure 6:
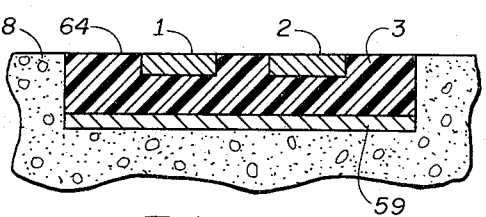
Figure 7:
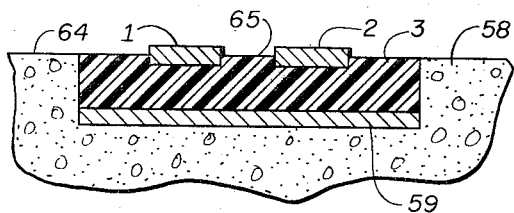

In the system of FIG. 5, the dielectric slab 3 may constitute a solid relatively non-flexible, low loss material such as a ceramic material coated on one side with a conductive ground plate 59 made of copper and supporting on an upper surface the spaced copper strip lines 1 and 2. The upper surface 64 of dielectric slab 3 is arranged to be flush with the upper surface of the roadway 58. It is seen that an object such as a vehicle tire rolling over conductors 1 and 2 changes or distorts the electromagnetic-field-coupling pattern between strip lines 1 and 2. To the extent that the pressure on the tire due to the weight of the vehicle causes the tire to flex into the gap 65 between conductors 1 and 2, the degree of electromagnetic-field-coupling may be additionally altered over that when gap 65 is occupied only by air. In FIGS. 6 and 7, it is illustrated that the strip conductors 1 and 2 may be partially or totally inlaid within the surface of dielectric slab 3, leaving an air gap 65 of lesser but finite depth in the instance of FIG. 7, but no air gap in the case of FIG. 6. In certain applications, other clearly related configurations may be found serviceable. In some instances, it may be desirable to protect the strip transmission line sensor from water or dirt or the like. In others, such as those in which the sensor is used to monitor the passage of people, it may be particularly desirable to hide the transmission line conductors 1 and 2 from view, as by use of a thin opaque rug or other dielectric covering overlying conductors 1, 2.

Figure 8:
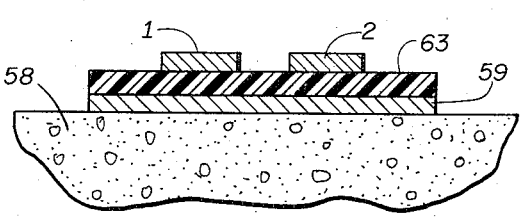
FIG. 8 is an alternative to the arrangement of FIGS. 5, 6, and 7.

In a simple arrangement for use in temporary installations, the sensor may take the form shown in FIG. 8, where conductors 1 and 2 are thin flexible conducting foils affixed to a flexible low loss sheet 63 of material such as cloth that may be unrolled across the path to be monitored and even fastened to the surface of the flooring or roadway 58 material. A thin film 59 of conductive foil is fastened to the bottom of the sensor before it is placed on the surface of roadway 58. It will be recognized that the dimensions and proportions shown in the various figures are exaggerated for convenience in making the drawings clear, and that the dimensions and proportions are therefore not necessarily those that would be used in actual practice. For example, the vertical dimensions in the cross sections of FIGS. 4 and 5 are exaggerated, since conductors 1, 2, and 59 may be made of relatively thin metal foil.

As noted above, the transmission line systems may be constructed of flat metal, electrically conducting strips 1 and 2 placed parallel to each other on a suitable dielectric substrate 3. The widths of the conductor strips 1 and 2 are determined by the desired impedance of the transmission lines. For example, if the connecting coaxial cables 8 and 9 of FIG. 1 are 50 ohm lines, 50 ohm strip lines 1 and 2 will be chosen. The width of gap 65 in FIG. 5 is selected, for example, according to the desired degree of coupling between conductors 1 and 2 and primarily upon the type of devices chosen for generator 10 and the signal processor receiver 12. For example, gap (65) widths of from 1/32 to 11/16 inches have been found useful in various circumstances.

Figure 9:
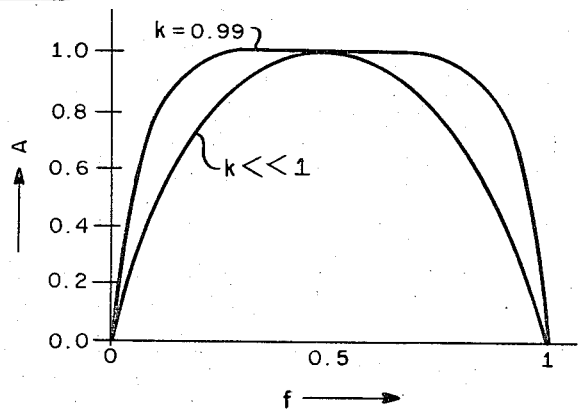
FIG. 9 is a graph that is useful in explaining the operation of the invention.

Still referring to FIG. 1, it is a feature of the present invention that the length D of the active coupling region defined by transmission lines 1 and 2 is determined in a novel manner, being made equal to $\lambda_o/2$, where $\lambda_o$ is the operating wave length of oscillator 10 and therefore of the transmission lines 1, 2. FIG. 9 represents the band width characteristics of a coupler such as that of FIG. 1, the two curves representing the signal amplitude at output port connector 7 for a very small coupling coefficient between lines 1 and 2 ($k << 1$) and for a substantially unity coupling ($k = 0.99$). For intermediate values of k, other curves fall between the illustrated curves, as explained by G.F. Ross in the technical paper entitled: "The Relationship Between Risetime, Settling Time, Bandwidth, and Q in Certain Distributed Networks", page 26, Journal of the Franklin Institute, Vol. 291, No. 1, January 1971. It is also shown therein that the half-power band width increases with the coupling coefficient k, as indicated in FIG. 9.

In conventional applications of such couplers, a wide signal spectrum is to be coupled at input port connector 6 and a broad band response is desired of the coupler; then, the coupler selected is that having a wide flat response region about the median operating frequency at normallized abscissa 0.5. For use in the present invention, a maximum coupling is again usually selected, but the operating frequency is chosen to correspond to $\lambda_o/2$, which places the operating condition at the normalized abscissa value 1 in FIG. 9 where there is zero output from the output port at connector 7 of FIG. 1. The selected region adjacent abscissa value 1 provides rapid change in the output amplitude, even in less-than-unity coupling couplers, and is therefore desirable for use in the present invention.

It is thus seen that the length D of the coupling region is determined by the width of the passage or roadway to be monitored and that D determines the operating frequency for oscillator 10. According to the invention, the value $\lambda_o/2$ is chosen so that when a tire, for instance, passes over transmission lines 1, 2, the location of the null at abscissa 1 is drastically disturbed, with output port 7 signal amplitude changing in the order of 30 or 40 dB. The differentiator circuit 31 is sensitive to the rate of change about the null characteristic, and not to the null itself. Large signal changes are therefore supplied to threshold detector 32, and the system is highly responsive. Furthermore, should oscillator 10 drift off the null frequency, significant changes can still be observed from the output of differentiator 31 and the threshold detector circuit 32, as a closed feed back loop, may be used to maintain the null.

In the example of FIG. 1, it will be seen that for the average vehicle lane, a coupling region with a length D of about 10 feet may reasonably be employed, such a value corresponding to a $\lambda_o/2$ wave length for 50 megacycles, a frequency value that is readily provided by an inexpensive diode or transistor oscillator. It will also be understood that the function illustrated in FIG. 9 is an ever repeating function, so that nulls appear at normalized abscissa values 1,2,3,4, . . . ,n and so that corresponding choices of D could be made, such as $\lambda_o/2$, $\lambda_o$, $3\lambda_o/2$, etc. However, the $\lambda_o/2$ value would normally be used.

Figure 10:
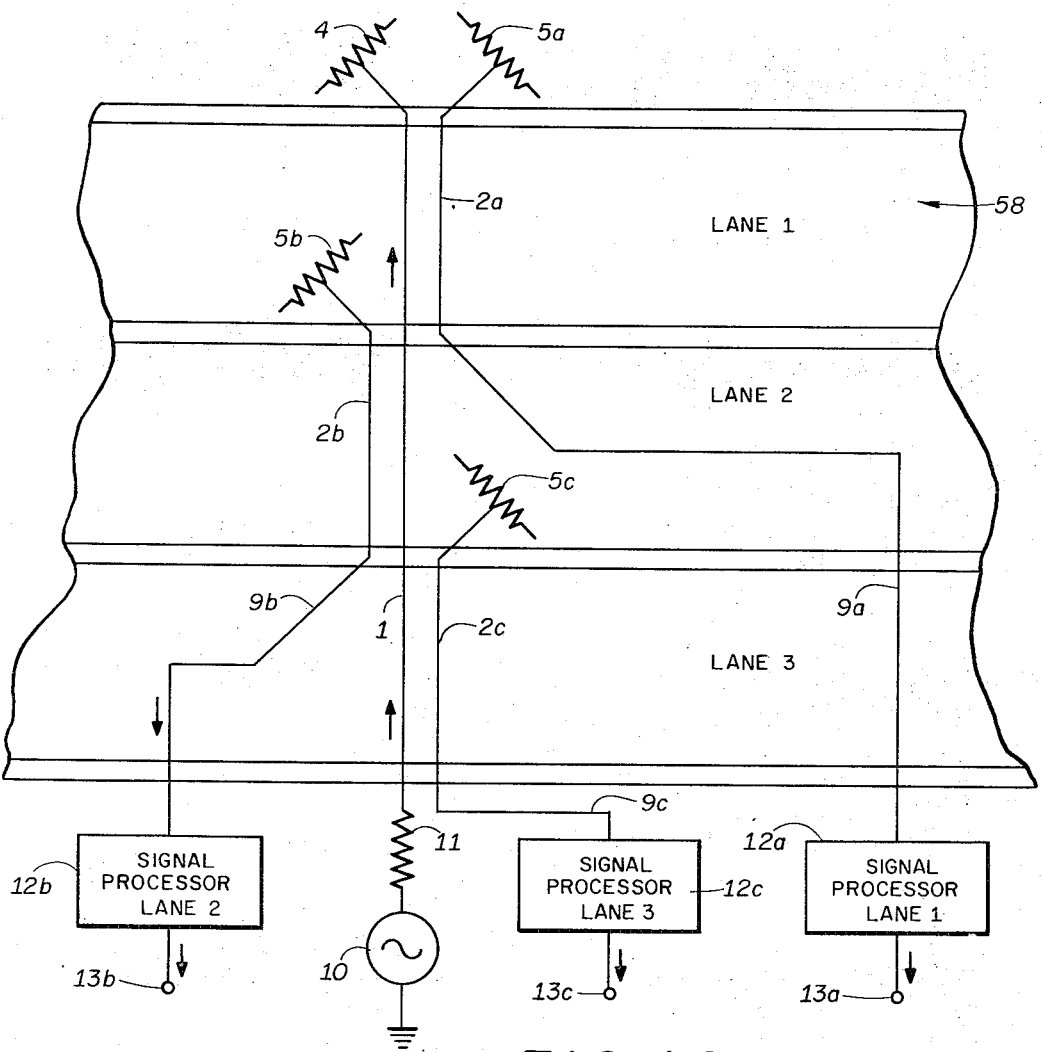
FIG. 10 is a schematic diagram in plan view of a system incorporating the invention for sensing vehicles on a triple-lane roadway.

The novel presence sensor may be employed, for instance, in detecting vehicles or other objects moving along multi-lane passageways or roads, such as in Lane 1, Lane 2, or Lane 3 of the roadway 58 of FIG. 10. In the arrangement of FIG. 10, generator 10 excites a strip transmission line 1 coupled in Lane 1 to the strip transmission line 2a, in Lane 2 to the strip transmission line 2b, and in Lane 3 to the strip transmission line 2c and provided with a termination 4. Thus, individual and independent coupler regions are provided in each of the three lanes, using strip line 1 as a common excitation line. The output strip transmission lines 2a, 2b, and 2c are respectively provided with matched terminations 5a, 5b, and 5c, and feed output signals to the individual lane signal processor receivers 12a, 12b, and 12c via planar or coaxial lines in the same general manner as in FIG. 1. The presence of a vehicle, for example, in Lane 2 produces a disturbance in the coupling between strip lines 1 and 2b and generates an output which is manipulated by signal processor receiver 12b to provide a transient output, as in FIG. 1, on output terminal 13b. The corresponding elements for Lanes 1 and 3 operate in a similar manner, producing a useful output signal on one of the respective terminals 13a and 13c in the presence of a vehicle in the associated one of the respective Lanes 1 or 3.

Figure 11:
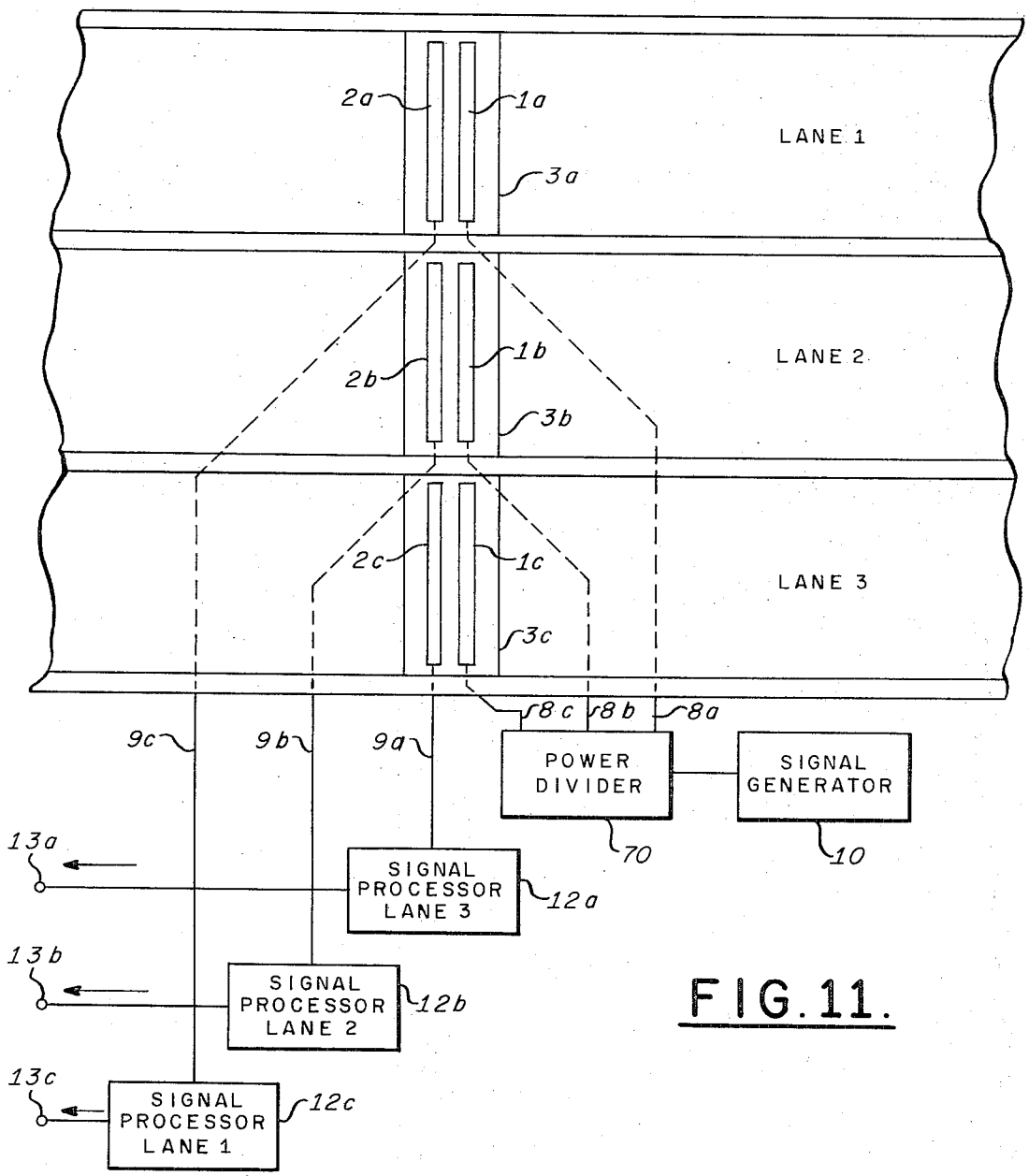
FIG. 11 is similar to FIG. 10 and shows a plan view of an alternative triple-lane roadway monitor.

FIG. 11 illustrates a triple lane arrangement somewhat similar to that of FIG. 10, but wherein excitation power is fed in parallel to the sensors, rather than in series. The character of the drawing is also so modified as to be less schematic than that of FIG. 10 and to present a plan view showing the physical appearance of the several sensors. Signal generator 10 supplies energy to a conventional power divider 70 which, in turn, feeds continuous wave energy through buried coaxial transmission lines 8a, 8b, 8c, to the respective coupler input transmission lines 1a, 1b, and 1c, each mounted on a corresponding dielectric substrate 3a, 3b, or 3c. In the presence of a vehicle, each such coupler is capable of supplying via an output line 2a, 2b, or 2c a transient output signal to an associated signal processor receiver 12a, 12b, or 12c over a respective buried coaxial transmission line 9a, 9b, or 9c. In the presence of an input to one of the signal processor receivers 12a, 12b, 12c, an output consequently appears at a corresponding terminal 13a, 13b, 13c for application in utilization devices such as those of FIGS. 2 and 3.

It will be seen that the three sensors of FIG. 11 do not necessarily have to be placed in collinear relation, but may be staggered one relative to the others, depending upon the application involved. It will be understood that the several terminations of the three sensors are not shown in FIG. 11, as it is assumed that they may be encapsulated or placed below the surface of dielectric substrates 3a, 3b, and 3c. It will also be appreciated by those skilled in the art that the feed lines 8a, 8b, and 8c of FIG. 11 and the receiver lines 9a, 9b, and 9c may be other than coaxial transmission lines; it is to be understood that the strip transmission lines with their conductors flush with the surface of the roadway may also be used, all lines where coupling is not desired being appropriately separated according to well known techniques.

It is seen that the invention is a versatile presence detection device relatively immune to interference by environmental electrical noise signals, capable of recognition of the presence of a wide variety of objects including pedestrians and vehicles. The device involves sensing of presence by the measurement of a rapidly varying transmission line coupling parameter, rather than sensing of slowly varying bridge or resonant circuit parameters. The novel sensor system of the present invention, while having good sensitivity, inherently has low false alarm characteristics and is suitable for application in a wide variety of applications.

While the invention has been described in its preferred embodiments, it is to be understood that the words which have been used are words of description rather than of limitation and that changes within the purview of the appended claims may be made without departing from the true scope and spirit of the invention in its broader aspects.

We claim:

1. In combination:

a passageway surface means having a principal direction of passage, dielectric substrate means having surface means substantially coplanar with said passageway surface means, signal generator means for supplying continuous wave signals, transmission line energy coupling means excited by said continuous wave signals comprising first and second transmission line conductor means of finite length spaced apart in substantially parallel energy coupling relation on said substrate surface and lying substantially transverse of said principal direction, said coupling means having a predetermined coupling characteristic alterable according to the proximity of an object overlying at least a portion of said coupling means, receiver means for receiving presence detection signals in response to changes in said coupling characteristic, threshold detector means responsive to said receiver means for providing an output signal for signals generated by said receiver means of amplitude greater than a predetermined amplitude, and utilization means responsive to said threshold detector means.

2. Transmission line energy coupling object presence detector means having a predetermined high-frequency energy coupling characteristic comprising:

dielectric substrate means having surface means adapted to be placed in substantially coplanar relation with passageway surface means, first and second substantially parallel energy coupling planar transmission line conductor means at said dielectric surface means for defining a coupling region, said coupling region having a length D equal to $\lambda_o/2$, where $\lambda_o$ is the preferred operating high frequency wave length for said coupling means, said substrate means and said conductor means being so constructed and arranged as to respond to said object when overlying at least a portion of said coupling means by a change in the degree of energy coupling between said conductor means, and means responsive to said change.

3. Apparatus as described in claim 2 wherein said dielectric substrate means is placed within a recess in said passageway surface means.

4. Apparatus as described in claim 2 wherein said substrate means surface means includes a recessed portion between said conductor means.

* * * * *